(12) United States Patent
Yamaoka et al.

(10) Patent No.: US 6,787,735 B1
(45) Date of Patent: Sep. 7, 2004

(54) WELDING SOLID WIRE WITH HIGH FEEDING PERFORMANCE

(75) Inventors: Yukio Yamaoka, Osaka (JP); Byungro Park, Kyoungnam (KR); Dongsu Hwang, Kyoungnam (KR)

(73) Assignee: Kiswel Ltd., Changwon (KR)

( * ) Notice: Subject to any disclaimer, the term of this patent is extended or adjusted under 35 U.S.C. 154(b) by 0 days.

(21) Appl. No.: 09/926,003

(22) PCT Filed: Feb. 24, 2000

(86) PCT No.: PCT/KR00/00151
§ 371 (c)(1),
(2), (4) Date: Aug. 13, 2001

(87) PCT Pub. No.: WO00/50197
PCT Pub. Date: Aug. 31, 2000

(30) Foreign Application Priority Data

Feb. 25, 1999 (JP) .......................... 11-047562

(51) Int. Cl.⁷ .............................................. B23K 35/02
(52) U.S. Cl. .................................................. 219/145.1
(58) Field of Search ................. 219/145.1, 145.21, 219/145.22, 145.23, 145.31, 145.32, 145.41

(56) References Cited

U.S. PATENT DOCUMENTS

| | | | | |
|---|---|---|---|---|
| 3,107,176 A | * | 10/1963 | Witherell ..................... | 117/205 |
| 3,115,406 A | * | 12/1963 | Ballass et al. ................ | 75/124 |
| 3,431,091 A | * | 3/1969 | Soulary ..................... | 29/183.5 |
| 3,514,572 A | * | 5/1970 | Yoshifumi et al. .......... | 219/145 |
| 3,799,215 A | | 3/1974 | Willems | |
| 4,843,212 A | * | 6/1989 | Shneerov et al. ...... | 219/146.23 |

OTHER PUBLICATIONS

Modern Welding Technology 3rd ed. Howard B. Cary; Prentice–Hall NJ 1979 p. 121.*

* cited by examiner

*Primary Examiner*—M. Alexandra Elve
(74) *Attorney, Agent, or Firm*—Bacon & Thomas

(57) ABSTRACT

The invention an arc welding solid wire whose surface comprises copper plated film, wherein the elastic limit ratio (elastic limit/tensile strength) of the wire finally produced is controlled in the range between 50 and 88% by installing three to eight elastic limit ratio control vertical rollers and three to eight elastic limit ratio control transverse rollers which have a ratio D/d equal to 40 to 60, following coil control vertical and transverse rollers after final drawing.

10 Claims, 5 Drawing Sheets

WELDING SOLID WIRE WITH HIGH FEEDING PERFORMANCE

BACKGROUND OF THE INVENTION

1. Field of the Invention

The present invention relates to a welding solid wire with high feeding performance and arc stability on welding.

2. Description of the Related Art

Generally, from the viewpoint of improving the quality of a welded bead portion, arc stability on welding is important in a welding wire without regard to the kind of wire such as a solid wire, a flux cored wire or the like. Also, it is generally recognized that arc stability is closely related to feeding performance of the wire.

For example, Japanese Patent Laid-open Publication No. (Sho) 56-144892 discloses a solid wire plated with copper, which improves feeding performance by means of fluid lubricant retained within grooves which are formed on the surface of the wire, and by wet wire drawing work with grain boundary oxidation. Also, Japanese Patent Laid-open Publication No. (Hei) 5-1120 describes that arc stability of a wire may be obtained by performing wet wire drawing work of over one pass prior to plating work and improving adhesive performance of plating by cleaning the wire surface.

It has also been disclosed that improving the properties of lubricant used in wire drawing work stabilizes the feeding performance so that arc stability is improved.

Lately, for solid wires and flux cored wires, Japanese Patent Publication Nos. (Hei) 2-682806 and (Hei) 2-731505 disclose that arc stability is improved by forcing a reduction in the ratio of an apparent surface area calculated from the ratio of the substantial surface area to wire diameter.

It has also been disclosed in Japanese Patent Publication Nos. (Hei) 2-723793 and (Hei) 2-723799 that arc stability is improved by reducing impurities of over 0.2 $\mu$m in diameter which adhere to and remain on a wire surface.

The prior art described above relate to properties and conditions of a wire surface.

First, the problems in feeding systems for wires will be considered.

FIGS. 1A and 1B show the feeding system for a copper plated solid welding wire, and particularly FIG. 1A and FIG. 1B represent systems using a wire reel and a pail pack, respectively.

A wire 6 is fed from a wire reel 1 or a pail pack 10 into feeding rollers 2 or 9. Then, before feeding to a tip portion 5 of a welding zone, the wire 6 in the wire reel 1 is fed through a guide tool 3 and a cable 4 and the wire 6 in the pail pack 10 is directly fed through the cable 4. Most of cable 4 has a bent portion X or Y and wire 6 contacts with the inner wall of the cable 4, resulting in large resistance which decreases the feeding performance. In addition, the reference numeral 7 in drawings indicates an arc forming a bead between weld zone and the end portion of the wire 6, and the reference numeral 8 indicates a power source.

In addition, referring to FIG. 2 which is a sectional view of the welding tip portion 5, the wire 6 is subjected to large resistance at contact points A, B and C of the inner wall of the tip portion, which affects the feeding performance of the wire.

In the case as described above, it is natural that the change of the properties of the wire surface should affect the feeding performance, i.e. stability of the arc 7 at the end portion of the fed wire 6. However, it is not clear whether the properties of the wire surface relate to the feeding performance. Thus, the matters noted above have required close examination.

As high efficiency for welding has been required lately and the feeding speed of wires tends to increase, higher arc stability is also required, but technical developments for arc stability have not progressed accordingly.

SUMMARY OF THE INVENTION

The present invention addresses the matters discussed above. It is an object of the present invention to provide a solid welding wire which has high arc stability by stabilizing the feeding performance of the wire upon welding.

It is another object of the present invention to provide a solid welding wire whose surface comprises copper plated film and which has high arc stability and high feeding performance upon welding These and other objects will become apparent to one skilled in the art after having the benefit of the following disclosure.

The present invention is directed to an arc welding solid wire whose surface comprises copper plated film, wherein the elastic limit ratio of the finally produced wire is controlled in the range between 50 and 88%. The elastic limit ratio is defined as the ratio between elastic limit and tensile strength.

The elastic limit ratio is controlled by installing three to eight elastic limit ratio control vertical rollers and three to eight elastic limit ratio control transverse rollers. The elastic limit ratio control vertical and transverse rollers have a ratio D/d of 40 to 60, where "D" is roller diameter and "d" is wire diameter, and follow the coil control vertical and transverse rollers after final drawing of the welding solid wire whose surface comprises copper plated film.

DETAILED DESCRIPTION OF PREFERRED EMBODIMENTS

Figure 1A:
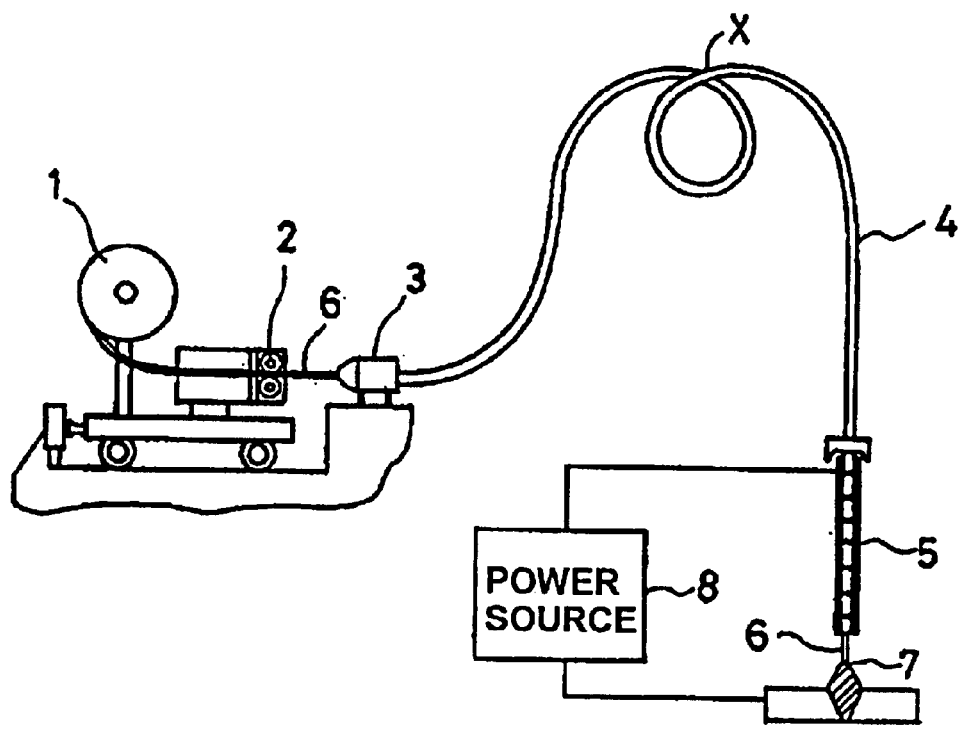
FIGS. 1A and 1B depict feeding systems for a solid welding wire.
Figure 1B:
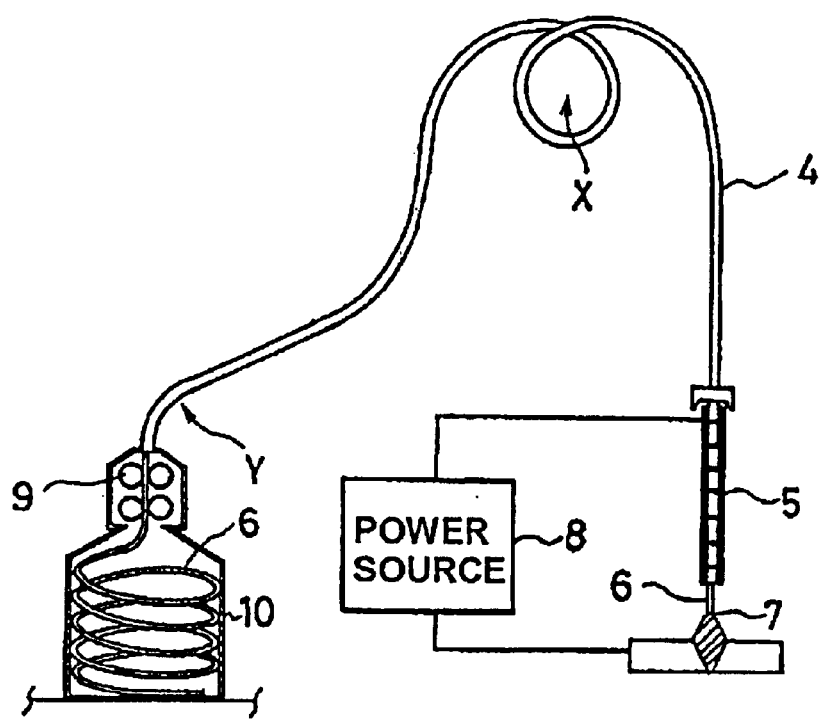
Figure 2:
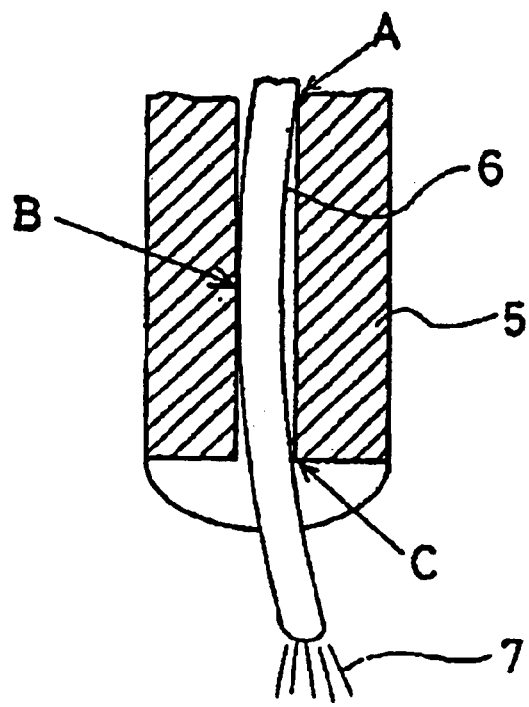
FIG. 2 is a cross-sectional view of a welding tip portion.
Figure 4:
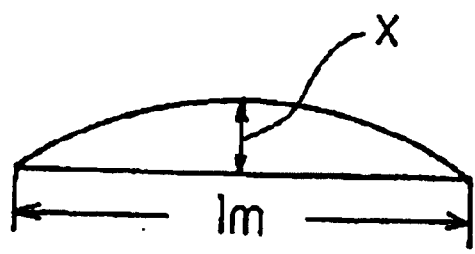
FIG. 4 illustrates an arc height that is generated by cutting a wire with a 1-meter chord.

To achieve the objects of the invention, wire feeding performance was closely examined from a new point of view. The subject matter of the examination was a solid welding wire which had a small change in surface properties as wet wire drawing work is performed after copper plating. The feeding path such as shown in FIGS. 1 and 2, and the relationships between the mechanical properties and the feeding performances of the wire itself were also carefully researched. As a result, it was newly discovered that the wire feeding performance is closely related to the mechanical properties of the wire.

That is, the coil properties of a solid wire which is set free after extraction from the reel or the pail pack were compared with the coil properties when the coil is cut after the solid wire is freely fed from the welding tip portion with the welding stopped. From this, it was discovered that wire extracted from the welding tip portion wherein the coil properties are in the specific predetermined range, has good stability and can be used in welding with good bead. Thus, the present invention is achieved by the discovery that the good stability is closely related to the elastic limit ratio (elastic limit:tensile strength) of the wire.

That is, the invention relates to a solid welding wire whose surface comprises copper plated film and wherein the ratio between the elastic limit and tensile strength, the elastic limit ratio, is controlled to be in the range between 50 and 88%, which will be described in the following.

Figure 3:
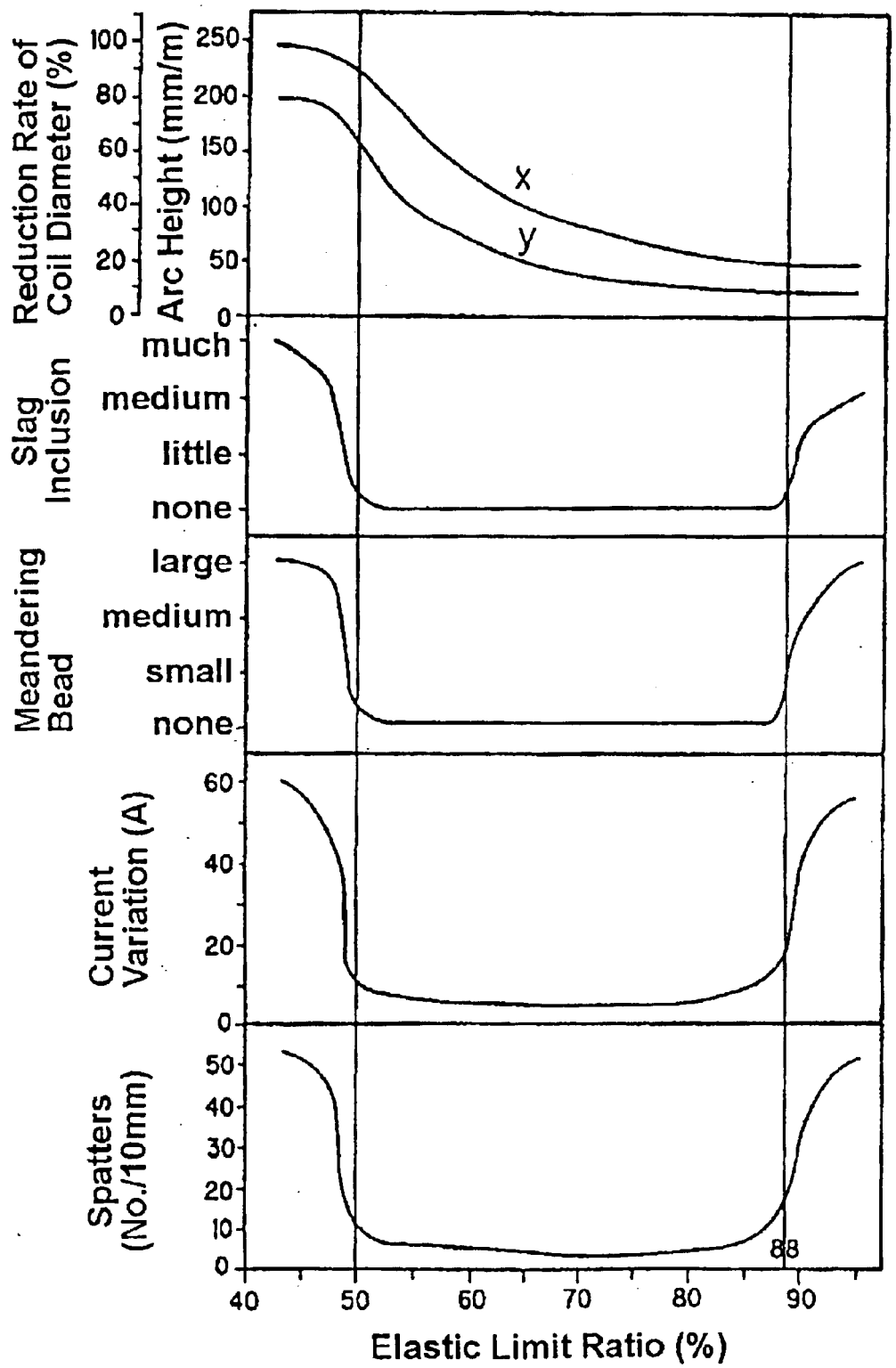
FIG. 3 is a group of graphs showing relationship between coil properties and the elastic limit ratio and between welding performances and the elastic limit ratio.

FIG. 3 is a group of graphs showing relationship between coil properties and the elastic limit ratio and between welding performances and the elastic limit ratio. The measurements of arc height x (mm/m), reduction rate of a coil diameter y(%), the existence of slag inclusion, the state of meandering beads, a variation of current on welding A, the number of spatters of over 1 mm in diameter (number/10 cm) and the elastic limit ratio shown in FIG. 3 are described as follows.

1) The arc height x (mm/m):

After extraction from the pail pack, the solid wire is wound four times around a cylinder of 100 mm in diameter and held for 30 seconds. Then, when it is set free, its arc height is the height of the arc made by cutting the wire into a chord of 1 m.

2) The reduction rate of a coil diameter y(%):

After set free from the reel, the diameter of the coil is measured. The wire is then wound twice around a cylinder of 100 mm in diameter and held for 30 seconds. The difference between the coil diameter after it is set free again and the coil diameter before being wound around the cylinder is measured. Thus, the reduction rate of the coil diameter is calculated from the difference in the two coil diameters.

3) The existence of slag inclusion, amount of meandering bead, the variation of current on welding and the number of spatters of over 1 mm in diameter:

These are found with performed by flat position welding.

4) The elastic limit ratio

Figure 5:
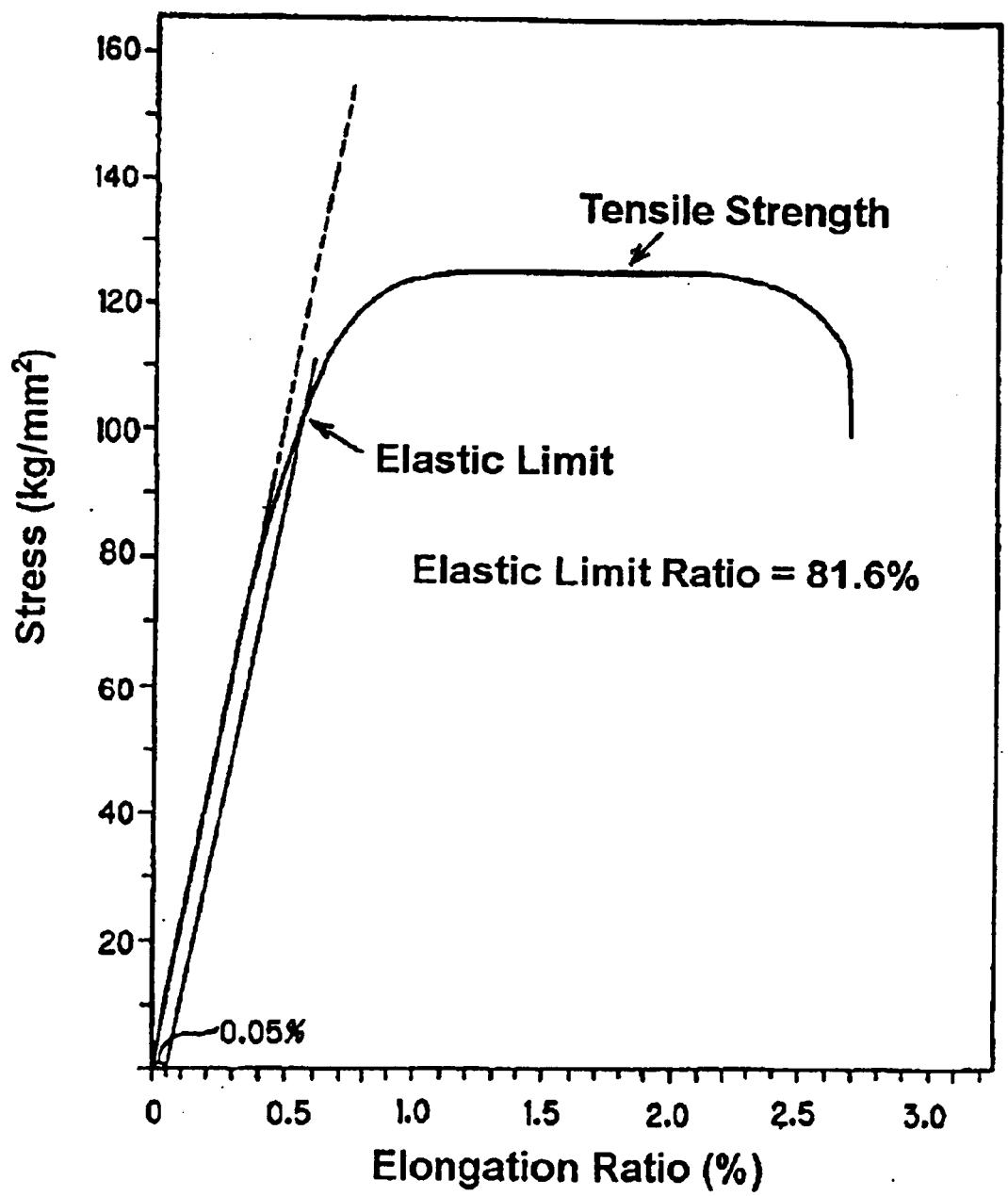
FIG. 5 is a graph showing relationship between stress and elongation ratio of a wire for achieving the elastic limit ratio.

After a stress-elongation ratio graph is plotted from tensile tests of the solid wire, the elastic limit ratio is derived from the elastic limit as the stress that corresponds to the permanent elongation ratio of 0.05% in FIG. 5.

For example, FIG. 5 shows the case of the elastic limit ratio (elastic limit/tensile strength) at 102/125 which is 81.6%.

As shown by the graphs in FIG. 3, solid wire is easily bent and there is a large change in the linearity of the wire or the diameter of free coil in proportion to the decrease in the elastic limit ratio. This disclosure shows for the first time that, contrary to such a tendency, welding performance is good when the elastic limit ratio is between 50 and 88%.

Therefore, in view of the results examined from the tendency, the following facts become clear.

If the elastic limit ratio is low and as the wire is easily bent, both the wire 6 wound around reel 1 with large coil diameter and the almost straight flat wire 6 in pail pack 10 are easily bent and deformed at the cable bending portion X or Y shown in FIG. 1 or at other cable bending portions with large curvature. Thus, the resistance between the wire 6 and the inner wall of the cable 4 is small since wire 6 follows the bent cable 4 easily. However, since the inside of the tip portion 5 shown in FIG. 2 as the final outlet of the wire is a fully straight hole, the bent wire is subjected to large resistance. As a result, the feeding performance of the wire deteriorates so that welding quality becomes poor.

If the elastic limit ratio is high, there is no problem for feeding at tip portion 5 having the straight hole as shown in FIG. 2. However, since the wire has a small change of linearity and deformation in the coil, the wire is not easily bent at the cable bending portion (X or Y) and has large spring-back force, so that the wire is subject to large resistance. Thus, the wire fed from the feeding rollers does not run smoothly so that the arc becomes unstable, and then the welding quality deteriorates as in the case of wire with low elastic limit ratio.

Therefore, when the elastic limit ratio is in the range between 50 and 88% which is neither low nor high as a compromise between these tendencies, wire is fed without large resistance at both the cable bending portion (X or Y) and the tip portion so that the arc is stabilized and welding quality is improved. That is, it is the feature of the present invention to avoid the condition wherein wire is subjected to large resistance between the wire source and the welding zone.

In accordance with the present disclosure, the relationship between arc stability and coil properties when feeding the wire automatically from the tip portion with the welding stopped, shows that the wire has a good arc stability as described above only in the specific predetermined range of coil properties.

The technology for maintaining the elastic limit ratio in the range between 50 and 88% is not limited to the examples herein and one skilled in the art will find variations after having the benefit of the present disclosure.

Figure 6:
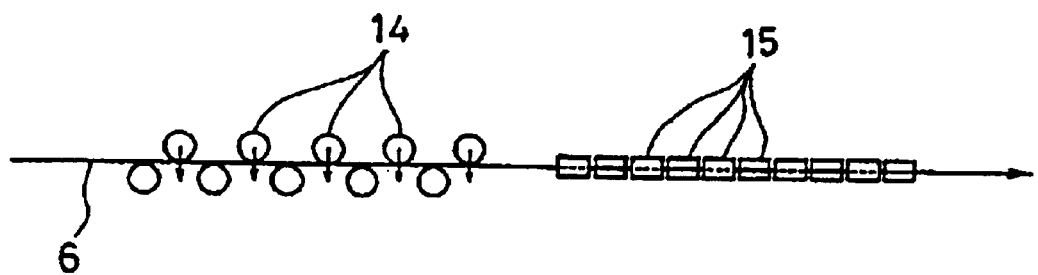
FIG. 6 depicts a conventional coil control vertical and transverse rollers.

Generally, in manufacturing a copper plated solid wire, the coil is controlled with coil control vertical and transverse rollers immediately after wet drawing work. As shown in FIG. 6, the wire is pressed upward, downward, leftward, and rightward by these rollers (D/d is 20, where D is roller diameter and d is wire diameter) comprising eight to twelve vertical rollers 14 and eight to twelve transverse rollers 15. Then, the wire is wound in the pail pack or around the reel. However, if strong pressure is exerted on wire 6, portions of it get wound with short frequency (fine wound deformation) which causes unstable arcs. Fine wound deformation is due to insufficiency of the vertical and transverse rollers alone for coil bending work to control the elastic limit ratio in the range of 50 to 88%. Thus, the object of the present invention cannot be achieved with only the vertical and transverse rollers as unstable arcs occur.

Figure 7:
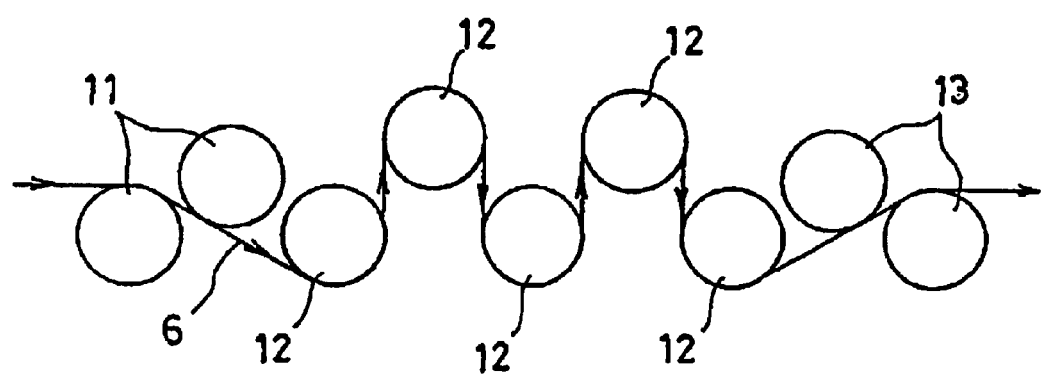
FIG. 7 illustrates the elastic limit ratio control rollers of the present invention.

Therefore, to control the stability of the elastic limit ratio without fine wound deformation in the wire, elastic limit ratio control rollers with a ratio D/d of 40 to 60 (again where D is roller diameter and d is wire diameter) as shown in FIG. 7 are necessary immediately following the vertical and transverse rollers as shown in FIG. 6. FIG. 7 shows five U-shaped hang-on rollers on which a wire is hung in the shape of a U and the wire 6 from a pair of guide rollers 11, passes through five bending rollers 12 as the vertical rollers and is drawn out of a pair of guide rollers 13. The transverse rollers which have the same configuration as the vertical ones are mounted in subsequence. In this configuration, it is possible to manufacture solid wire with no fine wound deformation that is stable in the desired elastic limit ratio.

Contrary to the arrangement in FIG. 6, the U-shaped hang-on rollers as shown in FIG. 7 are required for a running path for the wire.

Referring to a following example, a preferred embodiment of the invention will be explained.

Subjected to pickling and borax coating, a rod of 5.5 mm in diameter which contains 0.06% C, 0.9% Si, 1.5% Mn, 0.015% P, 0.01% S, and 0.11% Ti, is drawn up to 2.2 mm in diameter, and then annealed at about 700° C. After electrolytic-pickling (with sulfuric acid), water-cleaned, and treated with cyanic copper plating (plated copper of 3 g/kg Fe), the rod is finished as a welding solid wire of 1.2 mm in diameter at the rate of 400 m/min by drawing seven times with water-soluble lubricant used in a drawing machine. Two types of coils which are wound around a smaller reel of 20 kg after around a larger reel and wound in a pail pack, are manufactured.

To vary the elastic limit ratio of the solid wire manufactured by using coil control rollers as shown in FIG. 6, the ratio D/d is altered to 10 to 80 using the U-shaped hang-on vertical and transverse rollers followed by installed control rollers as shown in FIG. 7, and by changing the number of the vertical and transverse U-shaped hang-on rollers.

A bead of 60 cm is welded on fillet joint by flat position welding with the following welding conditions, current of 300 A, voltage of 32 V, and shield $CO_2$ of 30 l/min.

The properties of the solid wire itself are checked by changing the coil properties for the elastic limit ratio as shown in FIG. 3. Here, the elastic limit ratio is obtained from elastic limit/tensile strength, after plotting a graph for the stress-elongation ratio of FIG. 5 from the tensile test of the solid wire and determining the elastic limit from the stress corresponding to the permanent elongation ratio of 0.05%.

To evaluate the arc stability, the variation of current on welding, the existence of slag inclusion, the number of spatters of over 1 mm in diameter, and the state of meandering bead were all noted and recorded. The results are presented in the following Table 1.

As shown in Table 1, if the elastic limit ratio of the wire itself is controlled in the range between 50 and 88%, it is clear that neither slag inclusion nor meandering bead occurs, resulting in decrease of current on welding and the number of spatters, so that a good welding bead can be achieved.

According to the solid welding wire with good feeding performance of the present invention described in the claims, feeding performance and arc stability are improved by controlling the elastic limit ratio (elastic limit/tensile strength) of the solid wire in the range between 50 and 88% after final drawing in manufacturing copper plated, arc welding solid wire. Accordingly, good welding beads which have neither slag inclusion nor meandering beads, and have less spatter, can be easily achieved.

According to another variation in the invention described in the claims, three to eight elastic limit ratio control vertical rollers and three to eight elastic limit ratio control transverse rollers which have the ratio D/d of 40 to 60 are installed following coil control vertical and transverse rollers after final wire drawing work. In this arrangement, elastic limit ratio of solid wire can be easily controlled in the range between 50 and 88%.

This disclosure is not intended to limit the present invention to the examples disclosed herein. Rather, one skilled in the art will appreciate that numerous variations are possible after studying this specification. All these variations are within the scope and spirit of the invention as claimed below.

TABLE 1

| No. | Wire Diameter | Winding Type | Elastic Limit Ratio | Reduction Rate of Coil Diameter | Arc Height (mm/m) | Degree of Slag Inclusion | Degree of Meandering Bead | Current Variation (A) | Spatters (No./10 mm) | D/d | U-shaped Hang-on Rrollers | Remarks |
|---|---|---|---|---|---|---|---|---|---|---|---|---|
| 1 | 1.2 | Reel | 42.1 | 80.0 | 248 | much | large | 60 | 55 | 10 | 20 | comparative |
| 2 | | | 47.5 | 74.5 | 231 | medium | large | 48 | 46 | 35 | 18 | comparative |
| 3 | | | 50.0 | 60.0 | 225 | none | none | 10 | 8 | 40 | 16 | present invention |
| 4 | | | 60.1 | 25.0 | 120 | none | none | 7 | 5 | 48 | 14 | present invention |
| 5 | | | 75.2 | 11.0 | 70 | none | none | 6 | 3 | 50 | 12 | present invention |
| 6 | | | 85.4 | 9 | 50 | none | none | 9 | 8 | 55 | 10 | present invention |
| 7 | | | 88.0 | 9 | 48 | none | none | 15 | 17 | 60 | 6 | present invention |
| 8 | | | 91.2 | 9 | 50 | medium | medium | 49 | 45 | 65 | 4 | comparative |
| 9 | | | 95.0 | 10 | 50 | medium | large | 56 | 49 | 80 | 4 | comparative |
| 10 | | | 96.8 | 10 | 48 | mediutn | large | 60 | 52 | — | 0 | comparative |
| 11 | | Pail | 43.2 | 80.0 | 246 | much | large | 58 | 54 | 10 | 20 | comparitive |
| 12 | | Pack | 48.0 | 73.0 | 235 | medium | large | 49 | 48 | 35 | 18 | comparative |
| 13 | | | 50.0 | 59.4 | 220 | none | none | 11 | 7 | 40 | 16 | present invention |
| 14 | | | 61.2 | 24.8 | 125 | none | none | 7 | 5 | 48 | 14 | present invention |
| 15 | | | 76.6 | 11.2 | 72 | none | none | 6 | 3 | 50 | 12 | present invention |
| 16 | | | 86.1 | 8 | 48 | none | none | 8 | 8 | 55 | 10 | present invention |
| 17 | | | 88.0 | 9 | 47 | none | none | 16 | 16 | 60 | 6 | present invention |
| 18 | | | 92.0 | 9 | 50 | medium | medium | 50 | 45 | 65 | 4 | comparative |

TABLE 1-continued

| No. | Wire Diameter | Winding Type | Elastic Limit Ratio | Reduction Rate of Coil Diameter | Arc Height (mm/m) | Degree of Slag Inclusion | Degree of Meandering Bead | Current Variation (A) | Spatters (No./10 mm) | D/d | U-shaped Hang-on Rrollers | Remarks |
|---|---|---|---|---|---|---|---|---|---|---|---|---|
| 19 | | | 94.8 | 10 | 50 | medium | large | 57 | 49 | 80 | 4 | comparative |
| 20 | | | 95.2 | 9 | 48 | medium | large | 58 | 49 | — | 0 | comparative |

What is claimed is:

1. An arc welding solid wire whose surface comprises copper plated film, wherein the elastic limit ratio (elastic limit/tensile strength) of the wire finally produced is controlled in the range between 50 and 88%; with the proviso that said elastic limit ratio is controlled by installing three to eight elastic limit ratio control vertical rollers and three to eight elastic limit ratio control transverse rollers which have a ratio D/d equal to 40 to 60 (where D is roller diameter and d is wire diameter) following coil control vertical and transverse rollers after final drawing.

2. An arc welding solid wire of claim 1 wherein the elastic limit ratio (elastic limit/tensile strength) of the wire finally produced is 60.1.

3. An arc welding solid wire of claim 1 wherein the elastic limit ratio (elastic limit/tensile strength) of the wire finally produced is 61.2.

4. An arc welding solid wire of claim 1 wherein the elastic limit ratio (elastic limit/tensile strength) of the wire finally produced is 75.2.

5. An arc welding solid wire of claim 1 wherein the elastic limit ratio (elastic limit/tensile strength) of the wire finally produced is 76.6.

6. An arc welding solid wire of claim 1 wherein the elastic limit ratio (elastic limit/tensile strength) of the wire finally produced is 85.4.

7. An arc welding solid wire of claim 1 wherein the elastic limit ratio (elastic limit/tensile strength) of the wire finally produced is 86.1.

8. An arc welding solid wire of claim 1 wherein the elastic limit ratio (elastic limit/tensile strength) of the wire finally produced is 88.0.

9. The arc welding solid wire of claim 1 wherein the elastic limit ratio of the wire finally produced is controlled in the range between 60 and 88%, wherein the elastic limit is the stress corresponding to the permanent elongation ratio of 0.05%.

10. The arc welding solid wire of claim 1, wherein the elastic limit is the stress corresponding to the permanent elongation ratio of 0.05%.

* * * * *